US009596321B2

(12) United States Patent
Jusko et al.

(10) Patent No.: US 9,596,321 B2
(45) Date of Patent: Mar. 14, 2017

(54) SERVER GROUPING SYSTEM (71) Applicant: Cisco Technology, Inc., San Jose, CA (US)

(72) Inventors: Jan Jusko, Prague (CZ); Tomas Pevny, Prague (CZ); Martin Rehak, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 69 days.

(21) Appl. No.: 14/748,281

(22) Filed: Jun. 24, 2015

(65) Prior Publication Data

US 2016/0381183 A1    Dec. 29, 2016

(51) Int. Cl.
*G06F 11/00* (2006.01)
*G06F 12/14* (2006.01)
(Continued)

(52) U.S. Cl.
CPC .......... *H04L 67/42* (2013.01); *H04L 61/2007* (2013.01); *H04L 63/10* (2013.01);
(Continued)

(58) Field of Classification Search
CPC ..... H04L 67/42; H04L 61/2007; H04L 63/10; H04L 63/1433; H04L 63/1458; H04L 67/10
(Continued)

(56) References Cited

U.S. PATENT DOCUMENTS 7,689,652 B2 * 3/2010 Mishra ................ H04L 29/1215
709/206
7,716,737 B2 * 5/2010 Wilken ............... H04L 12/2602
709/224
(Continued)

FOREIGN PATENT DOCUMENTS

| EP | 1715624 | 10/2006 |
|---|---|---|
| KR | 1250899 | 4/2013 |
| WO | 2012/048744 | 4/2012 |

OTHER PUBLICATIONS

Alshammari, Riyad; Can Encrypted Traffic be Identified without Port Numbers, IP Addresses and Payload Inspection? Computer Networks, vol. 55, Issue 6, Apr. 25, 2011, pp. 1326-1350, ISSN 1389-1286.
(Continued)

*Primary Examiner* — Monjour Rahim
(74) *Attorney, Agent, or Firm* — Samuel M. Katz (57) ABSTRACT

In one embodiment, a method includes receiving client-server connection data for clients and servers, the data including IP addresses corresponding to the servers, for each one of a plurality of IP address pairs performing a statistical test to determine whether the IP addresses in the one IP address pair are related by common clients based on the number of the clients connecting to each of the IP addresses in the one IP address pair, generating a graph including a plurality of vertices and edges, each of the vertices corresponding to a different IP address, each edge corresponding
(Continued)

to a different IP address pair determined to be related by common clients in the statistical test, and clustering the vertices yielding clusters, a subset of the IP addresses in one of the clusters providing an indication of the IP addresses of the servers serving a same application.

18 Claims, 5 Drawing Sheets

(51) Int. Cl.

| | | |
|---|---|---|
| *G06F 12/16* | (2006.01) | |
| *G08B 23/00* | (2006.01) | |
| *H04L 29/06* | (2006.01) | |
| *H04L 29/12* | (2006.01) | |
| *H04L 29/08* | (2006.01) | |

(52) U.S. Cl.
CPC ...... *H04L 63/1433* (2013.01); *H04L 63/1458* (2013.01); *H04L 67/10* (2013.01)

(58) Field of Classification Search
USPC .......................................................... 726/23
See application file for complete search history.

(56) References Cited

U.S. PATENT DOCUMENTS

| | | | | |
|---|---|---|---|---|
| 8,031,599 | B2 | 10/2011 | Duffield et al. | |
| 8,191,136 | B2* | 5/2012 | Dudfield | H04L 41/0893 709/224 |
| 8,479,057 | B2* | 7/2013 | Poletto | H04L 41/0893 709/224 |
| 8,938,209 | B2 | 1/2015 | Crawford et al. | |
| 2004/0199793 | A1* | 10/2004 | Wilken | H04L 12/2602 726/22 |
| 2008/0098375 | A1* | 4/2008 | Isard | G06F 11/1438 717/149 |
| 2011/0234594 | A1* | 9/2011 | Charles | G06K 9/6224 345/440 |
| 2013/0024412 | A1* | 1/2013 | Gong | G06N 5/00 706/46 |
| 2013/0133072 | A1 | 5/2013 | Kraitsman et al. | |
| 2013/0204997 | A1 | 8/2013 | Eggleston et al. | |
| 2014/0258489 | A1 | 9/2014 | Muppala et al. | |
| 2014/0359126 | A1* | 12/2014 | Breternitz | H04L 47/70 709/226 |
| 2015/0379121 | A1* | 12/2015 | Akolkar | G06F 17/30707 707/723 |

OTHER PUBLICATIONS

Coull, Scott E.; On Measuring the Similarity of Network Hosts: Pitfalls, New Metrics, and Empirical Analyses, In Proceedings of the 18th Annual Network and Distributed Systems Security Symposium, Feb. 2011.
Crotti, Manuel; Traffic Classification Through Simple Statistical Fingerprinting; SIGCOMM Comput. Commun. Rev. 37, 1 (Jan. 2007), 5-16.
Kohout, Jan; Automatic Identification of Functional Structure of a Complex Cloud Service, 2015, An IP.com Prior Art Database Technical Disclosure, IP.com No. 000240346 Can be seen at: http://ip.com/IPCOM/000240346.
Liberatore, Marc; Inferring the Source of Encrypted HTTP Connections, 2006; In Proceedings of the 13th ACM conference on Computer and communications security (CCS '06). ACM, New York, NY, USA, 255-263.
Mathur, Suhas; Detecting Hidden Enemy Lines in IP Address Space, 2013, Proceedings of the 2013 Workshop on New Security Paradigms Workshop. NSPW '13. ACM. New York, NY, USA.
Roughan, Matthew; Class-of-Service Mapping for QOS: A Statistical Signature-Based Approach to IP Traffic Classification; 2004, In Proceedings of the 4th ACM SIGCOMM conference on Internet measurement (IMC '04). ACM, New York, NY, USA, 135-148.
Schatzmann, Dominik; Digging into HTTPS: Flow-Based Classification of Webmail Traffic, 2010; In Proceedings of the 10th ACM SIGCOMM conference on Internet measurement (IMC '10). ACM, New York, NY, USA, 322-327.
Soysal, Murat; Machine Learning Algorithms for Accurate Flow-Based Network Traffic Classification: Evaluation and Comparison (Jun. 2010).
Sun, Qixiang; Statistical Identification of Encrypted Web Browsing Traffic; Security and Privacy, 2002. Proceedings. 2002 IEEE Symposium on , vol., no., pp. 19,30, 2002.
Auld, Tom; Bayesian Neural Networks for Internet Traffic Classification, Neural Networks, IEEE Transactions on , vol. 18, No. 1, pp. 223,239, Jan. 2007.
Carstens, Juergen; Application Protocol Identification in Data Network Based on Naive Bayes Identifier, Dec. 23, 2008, IP.com Disclosure No. IPCOM000177098D Can be seen at: http://priorart.ip.com/IPCOM/000177098.
Meraki Traffic Shaper (2015) Can be seen at: https://meraki.cisco.com/lib/pdf/meraki_datasheet_traffic_shaper.pdf.

* cited by examiner

SERVER GROUPING SYSTEM

TECHNICAL FIELD

The present disclosure generally relates to grouping servers based on client-server connection data.

BACKGROUND

Cloud administration tools, as well as cloud-based intrusion detection systems, typically depend on the ability to gain formal understanding of very complex network traffic. Different cloud environments can substantially differ depending on the particular software environment, geographic zone, distribution of user activities and services, etc. Analyzing network traffic and gaining a higher-level view of network traffic in a cloud can thus become prohibitive if it depends on an exact knowledge of technical details of each particular software protocol, service, or tool in use in such a cloud. Complete technical knowledge about the cloud environment is difficult to obtain in full, especially as cloud is quickly evolving.

BRIEF DESCRIPTION OF THE DRAWINGS

The present disclosure may be understood and appreciated more fully from the following detailed description, taken in conjunction with the drawings in which.

DESCRIPTION OF EXAMPLE EMBODIMENTS

Overview

There is provided in accordance with an embodiment of the present disclosure, a method including receiving, by a communication interface, client-server connection data for a plurality of clients and a plurality of servers, the client-server connection data including a plurality of server Internet Protocol (IP) addresses corresponding to the plurality of servers, for each one IP address pair of a plurality of IP address pairs selected from the plurality of server IP addresses, performing, by a processor, a statistical test to determine whether the server IP addresses in the one IP address pair are related by common clients based on the number of the clients connecting to each of the server IP addresses in the one IP address pair, generating, by the processor, a graph including a plurality of vertices and a plurality of edges between the vertices, each of the vertices corresponding to a different one of the server IP addresses, each one edge of the edges corresponding to a different one of the IP address pairs determined to be related by the common clients in the statistical test, the one edge connecting the server IP addresses in the one IP address pair determined to be related by the common clients in the statistical test, and clustering, by the processor, the vertices in the graph yielding a plurality of clusters, each of the clusters including the vertices representing a subset of the server IP addresses, the subset of the server IP addresses in one of the clusters providing an indication of the IP addresses of the servers serving a same application.

DESCRIPTION

Figure 1:
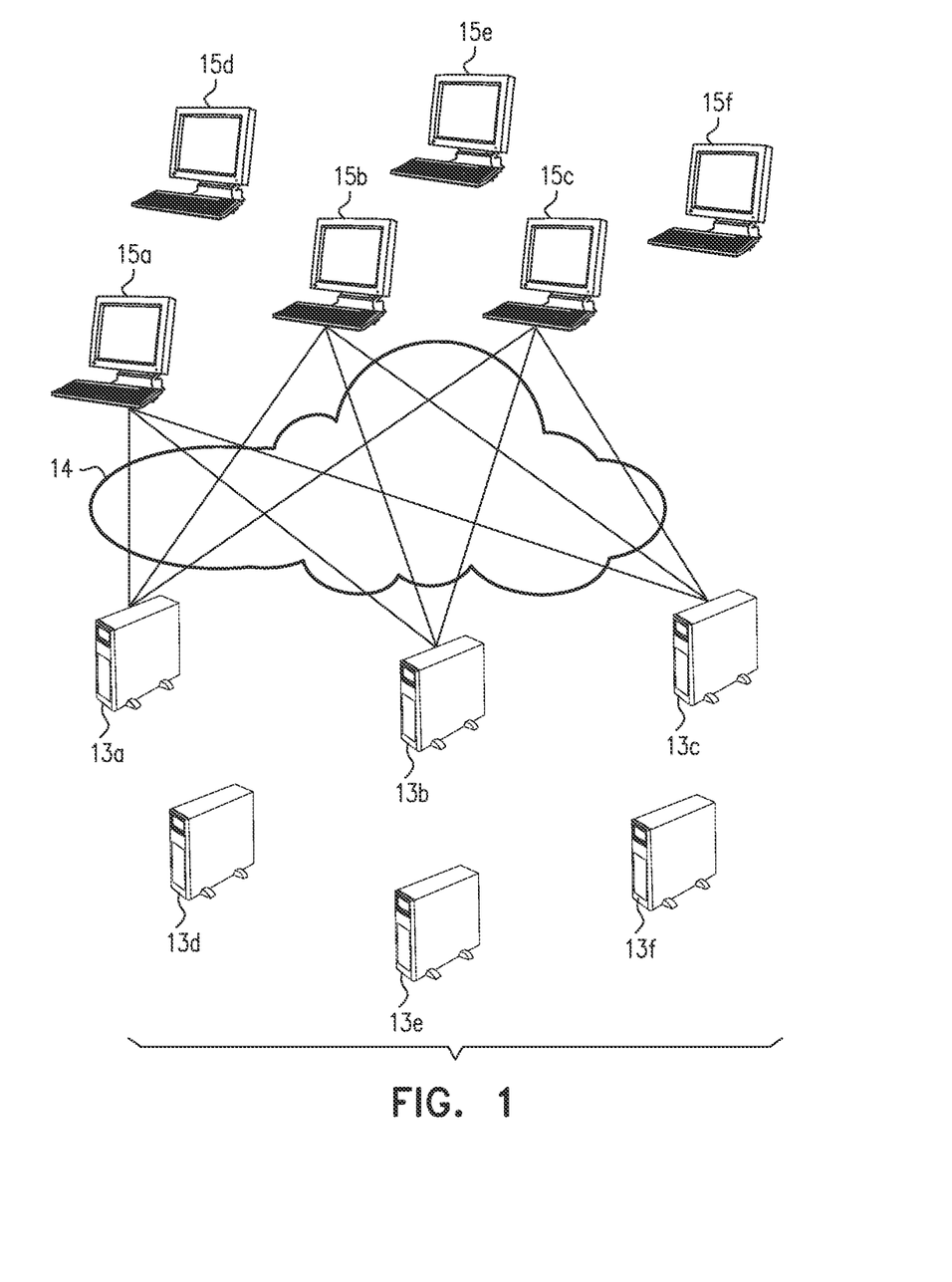
FIG. 1 is a pictorial view of clients connecting to servers in an Internet Protocol environment constructed and operative in accordance with an embodiment of the present disclosure.

Reference is now made to FIG. 1, which is a pictorial view of a plurality of clients 15a-c connecting to a plurality of servers 13a-c in an Internet Protocol environment 14 constructed and operative in accordance with an embodiment of the present disclosure. FIG. 1 also shows a plurality of servers 13d-f and a plurality of clients 15d-f. The clients 15a-f are collectively referred to as clients 15. The servers 13a-f are collectively referred to as servers 13. Each of the servers 13 typically includes suitable processing hardware, memory and a communication interface for receiving and sending IP packets (not shown).

By way of introduction, one particular challenge is the task of identifying logical groups of cooperating Internet Protocol (IP) addresses that together serve as a backend of a cloud service. The problem becomes exceptionally hard when considering connection to raw IP addresses (not towards a host name) and encrypted traffic, because a substantial portion of information about the traffic is hidden and the information that can be used for statistical modeling is significantly limited.

Currently, a relatively significant percentage of the traffic observed by the Cisco's Cloud Web Security (CWS) is encrypted, and around half of the encrypted traffic is directed to raw IP addresses. The encrypted flows are troublesome for flow-based analysis and payload-based analysis and anomaly detectors. Anomaly detection is problematic when applied to encrypted flows because anomaly detection often uses URL-based features that are not available for encrypted flows as the path or query string generally may not be seen. Also, packet payload based analysis is very difficult because the content of the packets is encrypted. Not much information can be extracted from encrypted flows to raw IPs and it is typically unknown which flows are induced by the same application or which remote contacted IP addresses serve the same application or service.

Sometimes partial information about the application/service inducing the traffic can be inferred from the Autonomous System, where the communication is directed to, or from, a specified User Agent. Within the Internet, an Autonomous System is a collection of connected Internet Protocol (IP) routing prefixes under the control of one or more network operators on behalf of a single administrative entity or domain that presents a common, clearly defined routing policy to the Internet. Unfortunately, many applications use content delivery networks that serve several applications and thus inference based on the Autonomous System is error-prone and most encrypted flows to raw IPs have an empty User Agent field. Moreover, a single owner of the Autonomous System can serve several applications; a typical example being Microsoft, which serves Hotmail, MSN Messenger, Skype, and several other applications.

An embodiment described herein includes a method and system of identifying groups of cooperating IPs based on observing the distribution of traffic flows. In particular, identifying groups of cooperating IPs is based on an assumption that the servers 13 serving a same application or service typically have a similar group of clients 15 connecting with the servers 13 for the same application or service, as shown in FIG. 1 for the servers 13a-c and the clients 15a-c.

Identifying servers serving the same application or service may be useful in a number of areas. For example, as an input to a method described in "Automatic identification of functional structure of a complex cloud service" published by IP.COM (Disclosure Number: IPCOM000240346D, Publication Date: 2015 Jan. 23), a subset of flows directed to a group of servers serving the same application may be selected for behavioral analysis to determine a type of application being served, used to link related flows together when reporting activity to the user in Cognitive Threat Analytics (a product available from Cisco Systems, Inc. of San Jose, Calif.), and to find groups of malware C&C (command and control) servers and the users connecting to the malware C&C servers. Some of the above examples are described in more detail with reference to FIG. 3.

Figure 2:
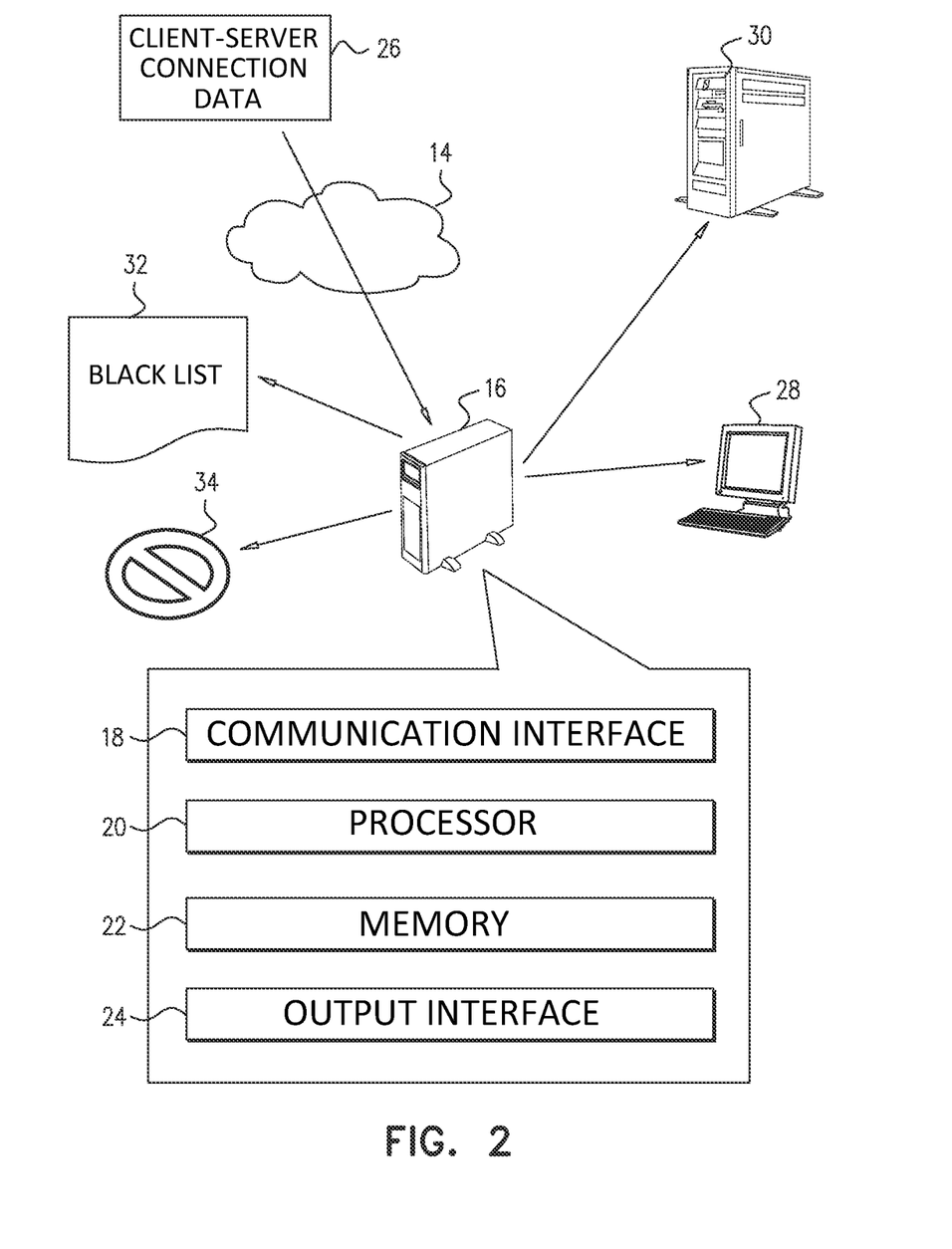
FIG. 2 is a partly pictorial, partly block diagram view of a server grouping system constructed and operative in accordance with an embodiment of the present disclosure.

Reference is now made to FIG. 2, which is a partly pictorial, partly block diagram view of a server grouping system 16 constructed and operative in accordance with an embodiment of the present disclosure. The server grouping system 16 includes a communication interface 18, a processor 20, a memory 22 and an output interface 24. The communication interface 18 is operative to receive client-server connection data 26 of connections between the clients 15 (FIG. 1) and the servers 13 (FIG. 1) via the Internet Protocol environment 14. The client-server connection data 26 may be based on HTTPS connections to raw IPs (i.e., connections that do not target any hostname, but rather the IP address directly) or non-encrypted data and/or connections that do target a hostname. The form of the client-server connection data 26 is described in more detail with reference to FIG. 3. The processor 20 is operative to process the client-server connection data 26 in order to provide an indication of the IP addresses of the servers 13 serving a same application. The indication of the IP addresses of the servers 13 serving a same application over HTTPS is based on the structure of the communication. Statistical methods are used to determine which pairs of IP addresses are related by the criteria of statistical significance. A graph G(V,E) is generated based on the statistical methods. The vertex set V represents the IP addresses of the servers 13 to which the clients 15, in the protected network, connect via HTTPS to a raw IP. E is a set of edges. Two vertices are linked by an edge if the two IP addresses that represent the two vertices are deemed as related according to the statistical method. The above method is described in more detail with reference to FIG. 3. The processor 20 may generate a blacklist 32 of IP addresses associated with the servers 13 representing a security threat or the processor 20 may block traffic (symbol 34) to the IP addresses of the servers 13 representing a security threat, by way of example only. The operation of the processor 20 is described in more detail with reference to FIG. 3. The memory 22 is operative to store data used by the processor 20. The output interface 24 is operative to output data to an output device, for example, but not limited to, a display monitor 28, a printer (not shown) or processing device 30 for further processing of the output data. The output data may include the IP addresses serving a same application, the IP addresses representing a security threat and/or a type of application served by a group of IPs, by way of example only.

Figure 3:
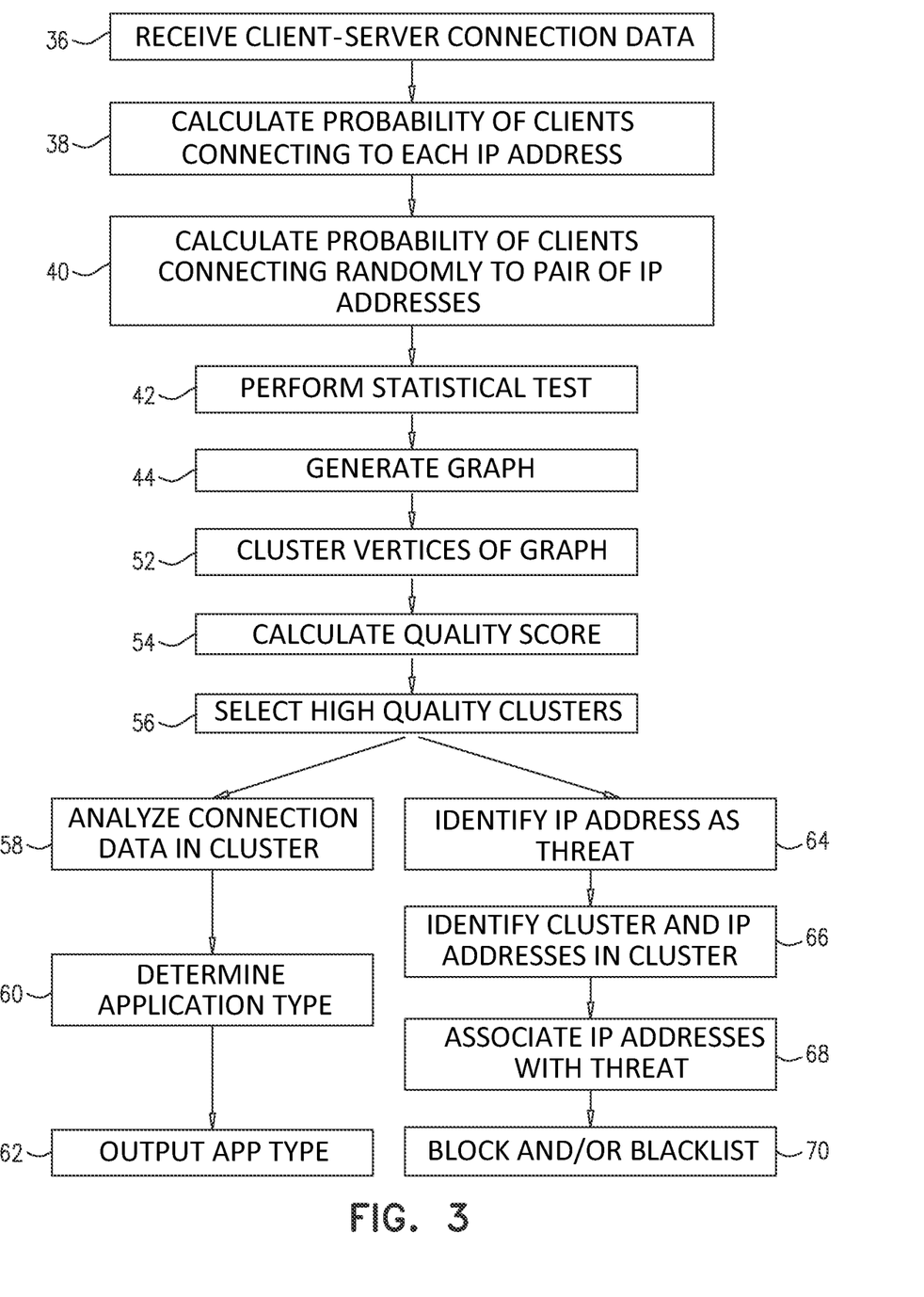
FIG. 3 is a flowchart of steps in an exemplary method of operation of the system of FIG. 2.

Reference is now made to FIG. 3, which is a flowchart of steps in an exemplary method of operation of the system 16 of FIG. 2. The communication interface 18 is operative to receive the client-server connection data 26 for the clients 15 and the servers 13 (block 36). The client-server connection data 26 includes a plurality of Internet Protocol (IP) addresses corresponding to the plurality of servers 13. The client-server connection data 26 may be comprised in a web log or multiple web logs. The web logs may be from one proxy server or multiple proxy servers. Each weblog is typically for a single proxy, listing connections from users or client devices behind the proxy to different servers 13. The web log typically includes information about requested URL (uniform resource locator), bytes transferred, timing and IP addresses of the servers 13 and clients 15 (users and/or user devices). The client-server connection data 26 may be comprised of network traffic flows if the client and server IPs can be distinguished. By way of example, network flows from a product called "Argus" (commercially available from QoSient LLC of New York, N.Y.) has bidirectional flows and the source flow identifies the client. In a case with unidirectional flows, such as Cisco NetFlow or IP/FIX (Internet Protocol Flow Information Export is an IETF protocol), corresponding flows (request/response) could be matched enabling determination of the client.

The processor 20 is operative to perform a statistical test for an IP address pair (two IP addresses) selected from the IP addresses of the servers 13 in the client-server connection data 26. The statistical test typically takes the form of a Binomial statistical test, but any other appropriate statistical may be used as well, for example, but not limited to, chi-squared test, Fisher exact test and G-test. The statistical test is operative to determine whether the two IP addresses in the IP address pair are related by common clients 15 based on the number of the clients 15 connecting to each of the IP addresses in the IP address pair. The test is repeated for each possible IP address pair selectable from the IP addresses.

The statistical test is based on various probabilities as input. The calculation of the probabilities and the details of the statistical test are described in more detail below. The processor 20 is operative, for each of the server IP addresses in the client-server connection data 26, to calculate a probability of any of the clients 15 (in the client-server connection data 26) connecting to that server IP address (block 38). The term "clients" as used in the specification and claims, is defined to include users or client devices. The probability may be calculated using any suitable method. One suitable method is the Maximum-likelihood method which calculates the probability as y/n, where y is the number of clients 15 connecting to the server IP address in the client-server connection data 26 and n is the total number of clients 15 in the client-server connection data 26. Another suitable method is the Bayesian method. The Bayesian method with beta distribution prior to smooth out the categorical data may be suitable as it avoids problems associated with low probability events. The probability may be calculated based on $(y+1)/(n+2)$.

The processor 20 is operative, for each IP address pair (selectable from the server IP addresses in the client-server connection data 26), to calculate a probability of any of the clients 15 (in the client-server connection data 26) randomly connecting to both of the server IP addresses in that IP address pair (meaning that the two server IP addresses in the IP address pair are not related) based on the probability of any of the clients 15 connecting individually to each of the server IP addresses in that IP address pair (block 40). If the probability of any of the clients 15 connecting to a server IP address A is denoted p(A) and the probability of any of the clients 15 connecting to a server IP address B is denoted p(B), then the probability of any of the clients 15 randomly connecting to both of the server IP addresses A and B is given by:

$$p(A,B)=p(A)\cdot p(B)$$

The above probability is the hypothesis that A and B are not related. If this hypothesis is rejected for some p-value (discussed in more detail below), the two addresses A and B are considered to be related. In other words, two server IP addresses are related if the number of clients 15 that connect to both of the server IP addresses is significantly larger than the expected value if the server IP addresses were unrelated. The term "expected value" of the server IP addresses being unrelated is given by the probability of clients 15 connecting to a host multiplied by the total number of clients 15. This statistical test is performed for every pair of server IP addresses.

For each server IP address pair, the processor 20 is operative to perform the statistical test based on the probability of any of the clients 15 randomly connecting to both of the server IP address in that IP address pair) yielding a p-value (block 42).

If the statistical test is a Binomial Test, the test may take the following form for each IP address pair (including server IP address A and server IP address B):

$$p\text{value}=1-\text{CDF}(\text{BINOMIAL}(n,p(A,B)),\text{observed}-1),$$

where "CDF" is a cumulative distribution function, "BINOMIAL" is a binomial distribution, "n" is the total number of clients 15 in the client-server connection data 26, and "observed" is the total number of clients 15 connecting to A and B in the client-server connection data 26.

The server IP addresses in an IP address pair are considered as being related by common clients 15 if the p-value is less than a certain value. In one embodiment, the certain value is within the range between approximately 0.05 and approximately 0.001, though it should be appreciated that the range may vary. A lower value may be more precise but less true positives may be found in the test. A value of 0.005 has been observed to be particularly useful. The value chosen may depend on the application that the server grouping system 16 is being used for, for example, if the application is automatic blacklisting then the value may be a lower value and if the application is manual investigation then the value may be a higher value.

Figure 4:
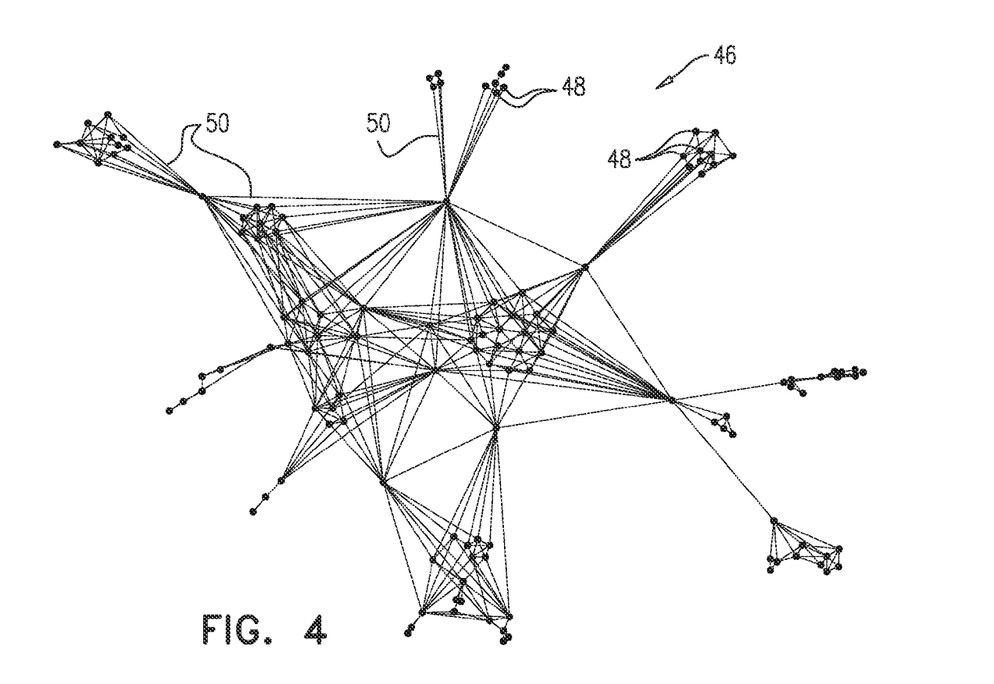
FIG. 4 is an exemplary graph generated by the system of FIG. 2.

The processor 20 is operative to generate a graph including a plurality of vertices and a plurality of edges between the vertices (block 44). Each vertex corresponds to a different one of the IP addresses of the servers 13. Each edge corresponds to a different IP address pair determined to be related by the common clients 15 in the statistical test. Each edge connects the server IP addresses in the IP address pair determined to be related by the common clients 15 in the statistical test. It should be noted that an aggregate graph may be generated from many component graphs described in more detail with reference to FIG. 6. When an aggregate graph is generated, the graph may include some, and in some cases all, of the edges from the component graphs as described in more detail with reference to FIG. 6. It should be noted that a "graph" is a mathematical term for a data set and does not need to be an actual pictorial representation although it could be expressed that way as shown in FIG. 4 which shows an exemplary graph 46 generated by the system 16 of FIG. 2. The graph 46 includes a plurality of vertices 48 (only some labeled for the sake of simplicity) and a plurality of edges 50 (only some labeled for the sake of simplicity). It should be noted that the p-value from the binomial test does not necessarily appear as a factor in the graph.

Reference is again made to FIG. 3. The processor 20 is operative to cluster the vertices in the graph yielding a plurality of clusters (block 52) to identify related server IP addresses. Any suitable clustering algorithm may be used for clustering the graph, for example but not limited to, the Louvain Method or Clique Percolation. Clique Percolation finds "dense" clusters and thus helps to avoid assignments of nodes to wrong clusters.

Figure 5:
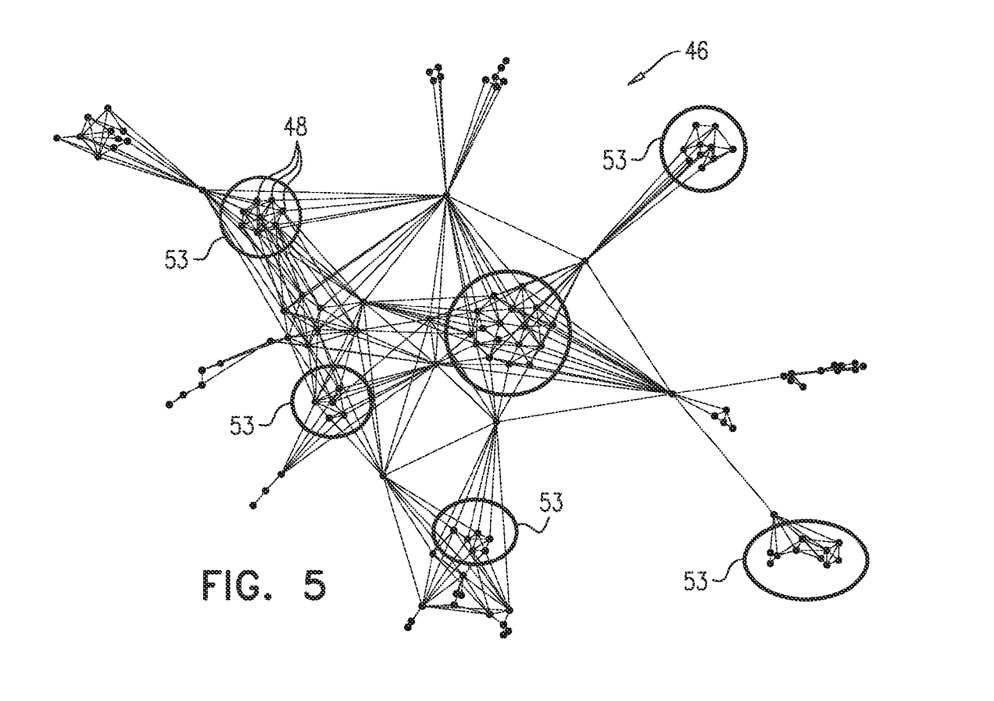
FIG. 5 is an exemplary graph with partial clustering, clustered by the system of FIG. 2.

Reference is now made to FIG. 5, which shows the exemplary graph 46 with partial clustering (i.e., not all the clusters are shown for the sake of simplicity), clustered by the system 16 of FIG. 2. FIG. 5 shows a plurality of clusters 53. Each of the clusters 53 includes the vertices 48 (only some labeled for the sake of simplicity) representing a subset of the server IP addresses.

Reference is again made to FIG. 3. Once clustering is performed, the quality of each cluster may be evaluated to determine whether the cluster is a well-defined cluster. Many metrics can be used to estimate the quality of clusters, for example Silhouette statistic can be used to estimate the quality of clusters. In the server grouping system 16, a custom metric may be used, now described below. The processor 20 is operative to calculate a quality score for each cluster 53. One suitable formula for the quality score is given by the following: IE/(IE+AE), where IE is the number of the edges 50 between the vertices 48 in that cluster 53 and AE is the number of edges 50 from the vertices 48 within that cluster 53 to the vertices 48 outside of that cluster 53 (block 54). The processor 20 is operative to select the clusters 53 having a quality score above a certain quality score (block 56), for example, above a quality score of 0.5. In certain applications, for example, blocking packets based on the clustering analysis, it may be desirable to use a higher score, for example, but not limited to, in the range of approximately 0.6 to approximately 0.9. For each selected cluster 53, the subset of the server IP addresses in that cluster 53 provides an indication of the IP addresses of the servers 13 serving a same application.

Some server IP addresses that are commonly used by clients 15 might appear to be related to many services even though the server IP addresses are not really related. Such server IP addresses are usually vertices that have a high degree and do not clearly belong to any cluster and may have a low clustering coefficient. An example is discussed below which describes calculating a ratio of the degree of a node to the local clustering coefficient in order to determine if the node should be removed. In graph theory, a local clustering coefficient is a measure of how close the neighbors of a node are to being a clique (a complete graph). In practice, these are usually IP addresses belonging to Google authentication service or Facebook chat, which are often used by clients 15 without any clear connection to other applications/services used by clients 15. Another example of such IP addresses are those belonging to Content Delivery Networks (CDN). CDNs, such as Akamai, may use a single IP address to serve several applications/services. The server grouping system 16 may be operative to remove such vertices. This removal may be performed prior to clustering. The local clustering coefficient can be calculated from the data outputted by the statistical test prior to the clustering. It may be useful to calculate a ratio for each of the nodes as the degree of a given node divided by the local clustering coefficient of that node and remove nodes which are further than twice the deviation from the mean of the distribution of the ratios.

The time interval for collecting the client-server connection data 26 needs to be considered. If the time interval is too short (for example, but not limited to 10 minutes or less) the resulting graph may be too sparsely populated to yield meaningful results. On the other hand, if the graph is created based on data collected from a relatively long period (for example, a 24 hour period), the graph may be very dense with limited cluster structure. A collection interval of about 1 hour has been found to be suitable.

The server IP addresses in a selected cluster 53 provides an indication of the IP addresses of the servers 13 serving a same application and may be used in a variety of ways as described above with reference to FIG. 1. Two of the ways are now described below in more detail. The first way is described below with reference to steps 58, 60 and 62 of FIG. 3. The second way is described below with reference to steps 64, 66, 68 and 70 of FIG. 3.

The processor 20 may be operative to analyze the client-server connection data 26 of the servers 13 having IP addresses included in one of the selected clusters 53 (block 58). The processor 20 may be operative, based on the analyzing, to determine an application type served by the servers 13 having the IP addresses included in that selected cluster (block 60). The application type may be determined based on the number of bytes transferred, timings. Alternatively, the processor 20 may submit the data for manual labeling by an operator who analyzes one of the servers 13 in the selected cluster to determine the application type. The output interface 24 (FIG. 1) may be operative to output the application type to an output device 28, 30 (block 62).

The processor 20 may be operative to identify a server IP address as a security threat (block 64). The server IP address may be identified as a security threat based on one of the flows to the server IP address being identified as a security threat. Security threats of flows may be identified based on external data or manual analysis. The processor 20 is then operative to identify a cluster (from the selected clusters 53) which includes the IP address identified as a security threat and identify the server IP addresses included in the identified cluster 53 (block 66) and associate the server IP addresses included in the identified cluster 53 with the security threat (block 68). The processor 20 is operative to block, or add to a blacklist, the server IP addresses associated with the security threat (block 70) and/or the output interface 24 (FIG. 1) is operative to output the server IP addresses associated with the security threat to an output device 28, 30.

The processor 20 may be operative to link related flows together based on the clustering when reporting activity to a user in Cognitive Threat Analytics. The activity may be reported by the output interface 24 (FIG. 1) outputting the data to an output device 28, 30.

Figure 6:
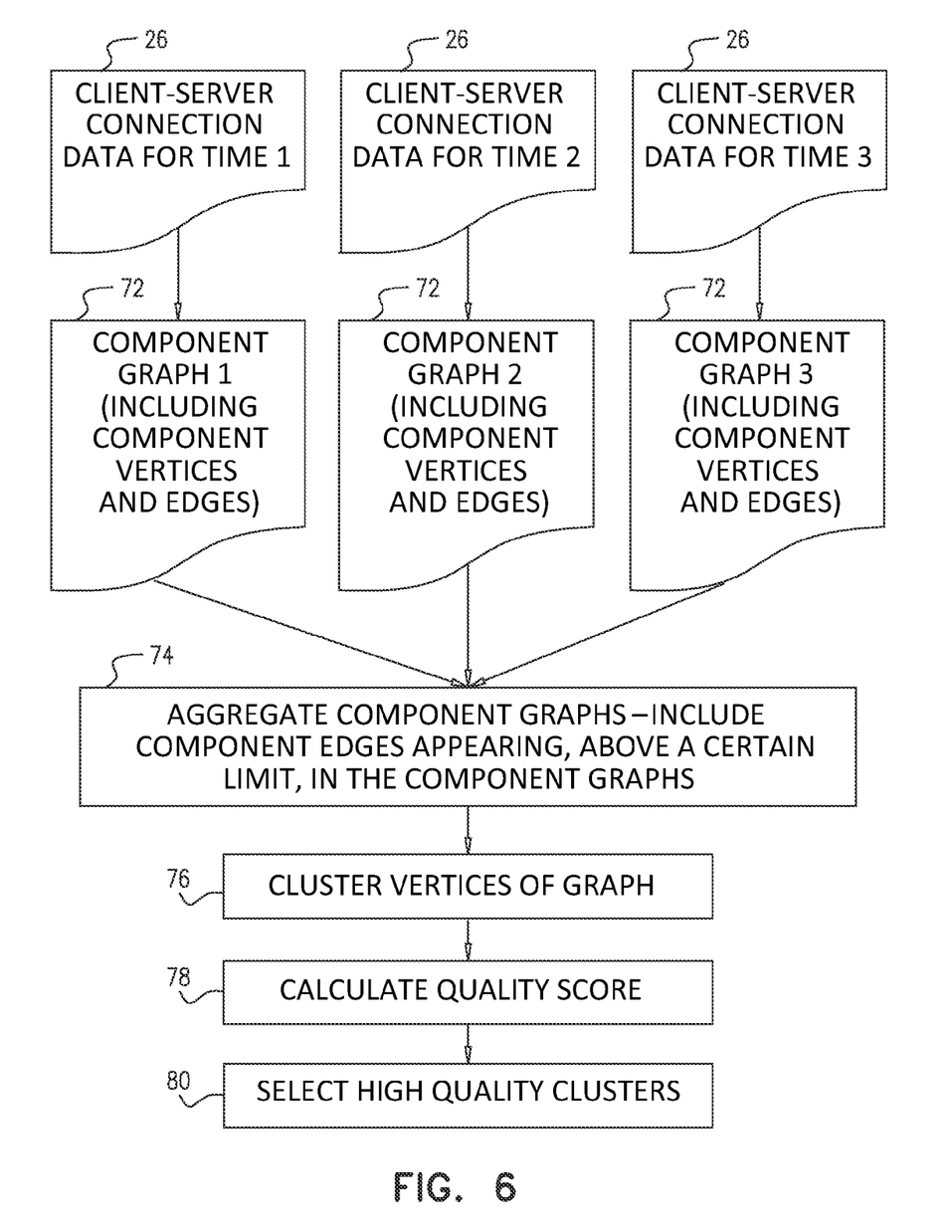
FIG. 6 is a flowchart of steps in an alternative exemplary method of operation of the system of FIG. 2.

Reference is now made to FIG. 6, which is a flowchart of steps in an alternative exemplary method of operation of the system 16 of FIG. 2. The quality of clustering is significantly improved if several graphs (referred herein as component graphs 72) are generated, one for each consecutive period of time based on the method described with reference to FIG. 3 using client-server connection data 26 for respective different time periods. Non-consecutive data may also be used. In other words, gaps in the consecutiveness of the data are possible but could distort results if the gaps are too large. The component graphs 72 are then aggregated to yield an aggregate graph (block 74). The vertices in the aggregate graph are then clustered (block 76), the clusters are scored (block 78) and high quality clusters are selected (block 80) based on the method described with reference to FIG. 3. The aggregate graph may, or may not, include all the edges included in all of the component graphs 72. The aggregate graph typically includes edges from the component graphs 72 if the edges appear in more than a certain percentage, for example between 30-100%, probably 50%, of the component graphs 72. Vertices with degree 0 (without any edges) can typically be ignored in any of the component graphs 72 since they typically do not form a cluster with any other vertex.

The aggregate graph generation is now described in more detail. The processor 20 is optionally operative to generate the graph as an aggregate graph aggregated from a plurality of component graphs 72. The component graphs 72 are generated based on client-server connection data 26 collected for a plurality of time periods wherein each of the component graphs 72 is generated based on the client-server collection data 26 for a different one of the time periods. The generation of each component graph 72 typically includes performing the statistical test on server IP address pairs included in the client-server connection data 26 for the relevant time period of that component graph 72 generating component vertices and component edges. The aggregate graph is generated to include a plurality of aggregate vertices and a plurality of aggregate edges. The aggregate edges correspond to the component edges that appear, above a certain limit, in the component graphs 72. The aggregate vertices correspond to the component vertices that appear in the component graphs and are connected by the aggregate edges in the aggregate graph. The process then continues with clustering the aggregate vertices in the aggregate graph.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It may be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It may be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
receiving, by a communication interface, client-server connection data for a plurality of clients and a plurality of servers, the client-server connection data including a plurality of server Internet Protocol (IP) addresses corresponding to the plurality of servers;
for each one IP address pair of a plurality of IP address pairs selected from the plurality of server IP addresses, performing, by a hardware processor, a statistical test to determine whether the server IP addresses in the one IP address pair are related by common clients based on the number of the clients connecting to each of the server IP addresses in the one IP address pair;
generating, by the hardware processor, a graph including a plurality of vertices and a plurality of edges between the vertices, each of the vertices corresponding to a different one of the server IP addresses, each one edge of the edges corresponding to a different one of the IP address pairs determined to be related by the common clients in the statistical test, the one edge connecting the server IP addresses in the one IP address pair determined to be related by the common clients in the statistical test;
clustering, by the hardware processor, the vertices in the graph yielding a plurality of clusters, each of the clusters including the vertices representing a subset of the server IP addresses, the subset of the server IP addresses in one of the clusters providing an indication of the server IP addresses of the servers serving a same application;
analyzing the client-server connection data of the servers having the server IP addresses included in a first cluster of the clusters; and
based on the analyzing, determining an application type served by the servers having the server IP addresses included in the first cluster.

2. The method according to claim 1, further comprising outputting the application type to an output device.

3. The method according to claim 1, further comprising:
identifying a first server IP address of the server IP addresses as a security threat;
identifying a first cluster of the clusters including the first server IP address;
identifying the server IP addresses included in the first cluster; and
associating the server IP addresses included in the first cluster with the security threat.

4. The method according to claim 3, further comprising at least one selected from a group including: blocking, the server IP addresses associated with the security threat; and adding to a blacklist, the server IP addresses associated with the security threat.

5. The method according to claim 1, further comprising:
for each one server IP address of the server IP addresses, calculating a first probability of any of the clients connecting to the one server IP address;
for each one IP address pair of the IP address pairs, calculating a second probability of any of the clients randomly connecting to both of the server IP addresses in the one IP address pair based on the first probability of any of the clients connecting individually to each of the server IP addresses in the one IP address pair; and
for each one IP address pair of the IP address pairs, performing the statistical test based on the second probability of the one IP address pair, yielding a p-value, the server IP addresses in the one IP address pair being related by common clients if the p-value is less than a certain value.

6. The method according to claim 5, wherein the certain value is within a range between 0.05 and 0.001.

7. The method according to claim 1, further comprising:
calculating a quality score for each one cluster of the clusters based on the following formula: IE/(IE+AE), where IE is a number of the edges between the vertices in the one cluster and AE is a number of edges from vertices within the one cluster to vertices outside of the one cluster; and selecting ones of the clusters having the quality score above a certain quality score.

8. The method according to claim 1, further comprising generating the graph as an aggregate graph aggregated from a plurality of component graphs, the component graphs being generated based on client-server connection data collected for a plurality of time periods wherein each of the component graphs is generated based on the client-server collection data for a different one of the time periods, the generation of each one component graph of the component graphs including performing the statistical test on IP address pairs included in the client-server connection data for the one time period of the one component graph generating component vertices and component edges, the aggregate graph being generated to include a plurality of aggregate vertices and a plurality of aggregate edges, the aggregate edges corresponding to the component edges that appear, above a certain limit, in the component graphs, the aggregate vertices corresponding to the component vertices that appear in the component graphs and are connected by the aggregate edges in the aggregate graph.

9. A system comprising:
a communication interface to receive client-server connection data for a plurality of clients and a plurality of servers, the client-server connection data including a plurality of server Internet Protocol (IP) addresses corresponding to the plurality of servers;
a hardware processor to:
perform, for each one IP address pair of a plurality of IP address pairs selected from the plurality of server IP addresses, a statistical test to determine whether the server IP addresses in the one IP address pair are related by common clients based on the number of the clients connecting to each of the server IP addresses in the one IP address pair;
generate a graph including a plurality of vertices and a plurality of edges between the vertices, each of the vertices corresponding to a different one of the server IP addresses, each one edge of the edges corresponding to a different one of the IP address pairs determined to be related by the common clients in the statistical test, the one edge connecting the server IP addresses in the one IP address pair determined to be related by the common clients in the statistical test;
cluster the vertices in the graph yielding a plurality of clusters, each of the clusters including the vertices representing a subset of the server IP addresses, the subset of the server IP addresses in one of the clusters providing an indication of the server IP addresses of the servers serving a same applications;
analyze the client-server connection data of the servers having the server IP addresses included in a first cluster; and
based on the analyzing, determine an application type served by the servers having the server IP addresses included in the first cluster.

10. The system according to claim 9, further comprising an output interface to output the application type to an output device.

11. The system according to claim 9, wherein the hardware processor is operative to:
    identify a first server IP address of the server IP addresses as a security threat;
    identify a first cluster of the clusters including the first server IP address;
    identify the server IP addresses included in the first cluster; and
    associate the server IP addresses included in the first cluster with the security threat.

12. The system according to claim 11, wherein the hardware processor is operative to perform at least one operation selected from a group including: block, the server IP addresses associated with the security threat; and add to a blacklist, the server IP addresses associated with the security threat.

13. The system according to claim 9, wherein the hardware processor is operative to:
    for each one server IP address of the server IP addresses, calculate a first probability of any of the clients connecting to the one server IP address;
    for each one IP address pair of the IP address pairs, calculate a second probability of any of the clients randomly connecting to both of the server IP addresses in the one IP address pair based on the first probability of any of the clients connecting individually to each of the server IP addresses in the one IP address pair; and
    for each one IP address pair of the IP address pairs, perform the statistical test based on the second probability of the one IP address pair, yielding a p-value, the server IP addresses in the one IP address pair being related by common clients if the p-value is less than a certain value.

14. The system according to claim 13, wherein the certain value is within a range between 0.05 and 0.001.

15. The system according to claim 9, wherein the hardware processor is operative to:
    calculate a quality score for each one cluster of the clusters based on the following formula: IE/(IE+AE), where IE is a number of the edges between the vertices in the one cluster and AE is a number of edges from vertices within the one cluster to vertices outside of the one cluster; and select ones of the clusters having the quality score above a certain quality score.

16. The system according to claim 9, wherein the hardware processor is operative to generate the graph as an aggregate graph aggregated from a plurality of component graphs, the component graphs being generated based on client-server connection data collected for a plurality of time periods wherein each of the component graphs is generated based on the client-server collection data for a different one of the time periods, the generation of each one component graph of the component graphs including performing the statistical test on IP address pairs included in the client-server connection data for the one time period of the one component graph generating component vertices and component edges, the aggregate graph being generated to include a plurality of aggregate vertices and a plurality of aggregate edges, the aggregate edges corresponding to the component edges that appear, above a certain limit, in the component graphs, the aggregate vertices corresponding to the component vertices that appear in the component graphs and are connected by the aggregate edges in the aggregate graph.

17. A computer software product, comprising a non-transitory, computer-readable medium in which program instructions are stored, which instructions, when read by a computer, cause the computer to:
    receive client-server connection data for a plurality of clients and a plurality of servers, the client-server connection data including a plurality of server Internet Protocol (IP) addresses corresponding to the plurality of servers;
    perform, for each one IP address pair of a plurality of IP address pairs selected from the plurality of server IP addresses, a statistical test to determine whether the server IP addresses in the one IP address pair are related by common clients based on the number of the clients connecting to each of the server IP addresses in the one IP address pair;
    generate a graph including a plurality of vertices and a plurality of edges between the vertices, each of the vertices corresponding to a different one of the server IP addresses, each one edge of the edges corresponding to a different one of the IP address pairs determined to be related by the common clients in the statistical test, the one edge connecting the server IP addresses in the one IP address pair determined to be related by the common clients in the statistical test;
    cluster the vertices in the graph yielding a plurality of clusters, each of the clusters including the vertices representing a subset of the server IP addresses, the subset of the server IP addresses in one of the clusters providing an indication of the server IP addresses of the servers serving a same application;
    analyze the client-server connection data of the servers having the server IP addresses included in a first cluster; and
    based on the analyzing, determine an application type served by the servers having the server IP addresses included in the first cluster.

18. The computer software product according to claim 17, wherein the program instructions also cause the computer to:
    for each one server IP address of the server IP addresses, calculate a first probability of any of the clients connecting to the one server IP address;
    for each one IP address pair of the IP address pairs, calculate a second probability of any of the clients randomly connecting to both of the server IP addresses in the one IP address pair based on the first probability of any of the clients connecting individually to each of the server IP addresses in the one IP address pair; and
    for each one IP address pair of the IP address pairs, perform the statistical test based on the second probability of the one IP address pair, yielding a p-value, the server IP addresses in the one IP address pair being related by common clients if the p-value is less than a certain value.

* * * * *

UNITED STATES PATENT AND TRADEMARK OFFICE
CERTIFICATE OF CORRECTION

PATENT NO. : 9,596,321 B2  
APPLICATION NO. : 14/748281  
DATED : March 14, 2017  
INVENTOR(S) : Jan Jusko et al.

Page 1 of 1

It is certified that error appears in the above-identified patent and that said Letters Patent is hereby corrected as shown below:

In the Claims

Column 10, Line 61, Claim 9, "applications;" to read as --application;--.

Signed and Sealed this
Twenty-third Day of May, 2017

Michelle K. Lee
*Director of the United States Patent and Trademark Office*